May 19, 1925.
O. REIMANN
APPARATUS FOR PREPARING LIVING TREES FOR COLORING THE WOOD
Filed March 21, 1923
1,538,745
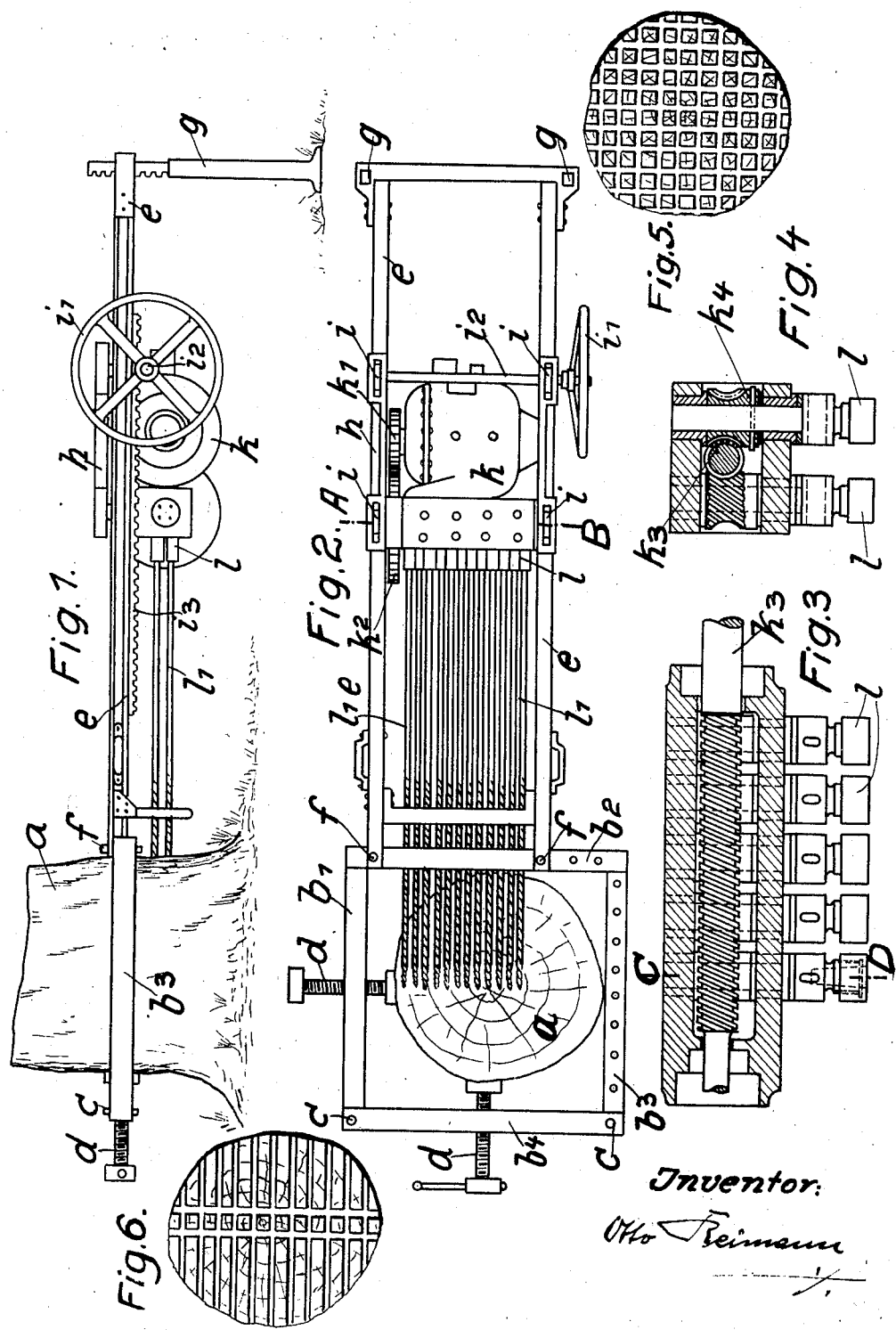
Inventor:
Otto Reimann Patented May 19, 1925.

1,538,745

UNITED STATES PATENT OFFICE.

OTTO REIMANN, OF CHARLOTTENBURG, NEAR BERLIN, GERMANY.

APPARATUS FOR PREPARING LIVING TREES FOR COLORING THE WOOD.

Application filed March 21, 1923. Serial No. 626,609.

*To all whom it may concern:*

Be it known that I, OTTO REIMANN, a citizen of the German Empire, residing at Charlottenburg, near Berlin, Germany, have invented certain new and useful Improvements in Apparatus for Preparing Living Trees for Coloring the Wood, for which I have filed an application in the German Empire January 22, 1923, and of which the following is a specification.

The invention relates to an apparatus for preparing living trees for coloring the wood.

For this purpose the trunk of the tree is provided in a horizontal plane just above the ground with two intersecting sets of parallel bores, so that the area of the trunk is subdivided in a grid-like manner, the bores being closed towards the outside and coloring matters or dyestuffs being introduced into one or more of these communicating bores under natural or artificial pressure. The coloring matter ascends the trunk of the tree in the same manner as the sap and stains wood throughout.

The improved apparatus for carrying out this process, and more particularly for producing the bores in the trunk of the tree, comprises means for bearing directing and driving drills for preparing the grid-like bores of the tree.

The improved machine is illustrated in the accompanying drawings which represents in:

Fig. 1 a side elevation of the improved machine,

Fig. 2 a plan of the machine,

Fig. 3 a cross-section along line A—B, Fig. 2,

Fig. 4 a cross-section along line C—D, Fig. 3,

Fig. 5 a cross-section through the trunk of a tree in the horizontal plane of the bores, Fig. 6 a cross-section through the trunk of the tree along the level of the bores.

Referring to Figs. 1 and 2 of the drawings, it will be seen that in carrying out my invention a U-shaped frame consisting of the parts $b^1$, $b^2$, $b^3$ is arranged around the trunk $a$ of the living tree at the place where the holes are to be drilled. This frame is completed to a rectangle by a part $b^4$ attached to the parts $b^1$ and $b^3$ of the frame by bolts $c$ or in any other suitable manner. After removal of the part $b^4$ this frame is put around the trunk of the tree as illustrated in Figs. 1 and 2, in such a manner, that the parts $b^2$ and $b^3$ are in contact with the trunk. The part $b^4$ is then put in place. In the parts $b^1$ and $b^4$ screws $d$ are provided, which are screwed towards the centre of the frame until they abut against the trunk $a$ and thus firmly and reliably fix the frame $b^1$, $b^2$, $b^3$, $b^4$ upon the trunk. Care is hereby taken that the frame takes up a horizontal position upon the trunk. Upon the frame $b^1$, $b^2$, $b^3$, $b^4$ is attached the front end of another frame $e$ by means of bolts $f$ inserted into bores of the part $b^2$ of the trunk frame. At its rear end the frame $e$ is raised by adjustable supports $g$, so that it can also be brought into a horizontal position. Upon the frame $e$ is mounted a carriage $h$, which is adapted to be moved along the frame $e$ by bolts $i$ by means of a hand-wheel $i^1$ upon the shaft $i^2$ of which wheels are keyed which gear with racks $i^3$ on the underside of the frame $e$. By turning the hand-wheel $i^1$ the carriage $h$ may be reciprocated along the frame $e$, that means be advanced towards or withdrawn from the trunk in correspondence with the direction of rotation of the hand-wheel $i^1$. From the carriage $h$ is suspended an electric or other motor $k$, which through a reduction gearing $k^1$, $k^2$, drives a worm $k^3$, see Fig. 3, which in its turn drives wormwheels $k^4$ upon the drill spindles. The drill spindles $l$ carry the parallel drills $l^1$, which when the motor is started and the carriage $h$ is advanced upon the frame $e$ drill parallel holes into the trunk, which traverse the entire trunk. When the holes in one half of the trunk are finished, as illustrated in Fig. 2, the drill frame $e$ is moved along the part $b^2$ of the trunk frame, that means downwards in Fig. 2, and the other half of the trunk is provided with holes in a similar manner. When the whole set of bores in one direction is completed, the drill frame $e$ is raised off the trunk frame and turned around by an angle of 90° and put upon the member $b^3$ of the trunk, the bolts $f$ being inserted into corresponding holes in this member. The drilling operation is then repeated from this from this side of the trunk, so that the bores produced from this side of the trunk intersect at approximately right angles those previously drilled, as shown in Fig. 5. The trunk of the tree is in this manner grid-like subdivided by the two sets of bores.

The trunk frame is manufactured in various sizes in accordance with the circumference of the trees. For trees of very large diameters it might be advisable to carry out the drilling operation in three or more stages, in which case the drill frame $e$ would be moved along the members $b^2$ and $b^3$ of the trunk frame two or more times until the whole width of the tree has been subjected to the operation. After one tree has been treated in the described manner, the trunk frame together with the drill frame is moved to another tree, where the operation is repeated.

In Fig. 6 the horizontal bores were produced by the apparatus shown in Figs. 1 and 2, while the vertical ones were produced by the apparatus shown in Figs. 6 and 7.

It will be understood that I do not limit my invention to the exact details of the apparatus illustrated as these may obviously be modified without departing from the spirit of my invention or sacrificing any of its advantages.

I claim:

The improved apparatus for coloring the wood of living trees, comprising in combination a square frame with a hinged member and two perforated adjacent fixed members, said frame being adapted to be tightened upon the trunk of the tree, clamping screws in said frame, a framework adapted to be connected with either of the perforated fixed members of said trunk frame and to be moved parallel with itself along said member, a carriage upon said framework, a plurality of parallel drills upon said carriage, a motor upon said carriage for driving said drills, and means for moving said carriage towards or away from the trunk of the tree.

In testimony whereof I have affixed my signature.

OTTO REIMANN.